US009965723B2

(12) United States Patent
Jackson et al.

(10) Patent No.: US 9,965,723 B2
(45) Date of Patent: May 8, 2018

(54) LEVERAGING UNIQUE OBJECT REFERENCES TO ENHANCE PERFORMANCE OF RETE-BASED RULE ENGINES

(71) Applicants: Jerry R. Jackson, Colorado Springs, CO (US); Mark Emeis, Monument, CO (US)

(72) Inventors: Jerry R. Jackson, Colorado Springs, CO (US); Mark Emeis, Monument, CO (US)

(73) Assignee: CA, Inc., New York, NY (US)

( * ) Notice: Subject to any disclaimer, the term of this patent is extended or adjusted under 35 U.S.C. 154(b) by 410 days.

(21) Appl. No.: 14/245,613

(22) Filed: Apr. 4, 2014

(65) Prior Publication Data

US 2015/0286932 A1 Oct. 8, 2015

(51) Int. Cl.
*G06N 5/04* (2006.01)
(52) U.S. Cl.
CPC ................................ *G06N 5/047* (2013.01)
(58) Field of Classification Search
CPC ...................................................... G06N 5/047
See application file for complete search history.

(56) References Cited

U.S. PATENT DOCUMENTS

| | | | | |
|---|---|---|---|---|
| 4,849,905 A * | 7/1989 | Loeb | ...................... | G06N 5/047 706/48 |
| 5,159,662 A * | 10/1992 | Grady | .................... | G06N 5/047 706/48 |
| 5,241,652 A * | 8/1993 | Barabash | ............... | G06N 5/047 706/10 |
| 5,265,193 A * | 11/1993 | Grady | .................... | G06N 5/047 706/48 |
| 6,078,911 A * | 6/2000 | Bonissone | ............... | G06N 7/04 706/46 |
| 7,349,980 B1 * | 3/2008 | Darugar | .............. | G06F 17/3089 709/211 |
| 7,603,358 B1 * | 10/2009 | Anderson | ......... | G06F 17/30554 |
| 7,853,565 B1 * | 12/2010 | Liskov | ............... | G06F 11/2097 705/53 |
| 2004/0034848 A1 * | 2/2004 | Moore | ................... | G06N 5/047 717/117 |
| 2004/0083454 A1 * | 4/2004 | Bigus | ....................... | G06N 5/04 717/117 |

(Continued)

OTHER PUBLICATIONS

Production Matching for Large Learning Systems, by Doorenbos, published 1995.*

(Continued)

*Primary Examiner* — Paulinho E Smith
(74) *Attorney, Agent, or Firm* — Baker Botts L.L.P.

(57) ABSTRACT

The embodiment of this disclosure may include a rule engine that adds a plurality of objects into a working memory, and processes the plurality of objects through a plurality of rules stored in a rule repository. Then, the rule engine may create a rule network comprising a root node and a child node based on the plurality of rules, and associate the root node with a predetermined list of object references. The rule engine may build a multi-object sub-token based on the plurality of objects that satisfy the predetermined list of object references. Then, the rule engine may pass the multi-object sub-token from the root node to the child node.

9 Claims, 6 Drawing Sheets

(56) References Cited

U.S. PATENT DOCUMENTS

| | | | | |
|---|---|---|---|---|
| 2005/0154695 A1* | 7/2005 | Gonzalez | .......... | G06F 17/30306 |
| 2005/0165707 A1* | 7/2005 | Rehberg | ................ | G06N 5/025 |
| | | | | 706/47 |
| 2005/0240546 A1* | 10/2005 | Barry | ..................... | G06N 5/046 |
| | | | | 706/47 |
| 2005/0246302 A1* | 11/2005 | Lorenz | .................. | G06N 5/025 |
| | | | | 706/47 |
| 2005/0262032 A1* | 11/2005 | Smith | ................. | G06N 99/005 |
| | | | | 706/47 |
| 2007/0038775 A1* | 2/2007 | Parekh | .................... | H04L 45/48 |
| | | | | 709/238 |
| 2007/0094193 A1* | 4/2007 | Joseph | .................. | G06N 5/042 |
| | | | | 706/46 |
| 2008/0097748 A1* | 4/2008 | Haley | ................. | G06F 17/2785 |
| | | | | 704/9 |
| 2008/0147584 A1* | 6/2008 | Buss | ....................... | G06N 5/025 |
| | | | | 706/47 |
| 2008/0222070 A1* | 9/2008 | Damodharan | ...... | G06F 11/2257 |
| | | | | 706/47 |
| 2008/0249860 A1* | 10/2008 | Carotta | ................. | G06Q 30/02 |
| | | | | 705/14.25 |
| 2008/0301078 A1* | 12/2008 | Proctor | .................. | G06N 5/022 |
| | | | | 706/47 |
| 2008/0301079 A1* | 12/2008 | Proctor | .................. | G06N 5/022 |
| | | | | 706/47 |
| 2009/0063385 A1* | 3/2009 | Proctor | .................. | G06N 5/025 |
| | | | | 706/48 |
| 2009/0157586 A1* | 6/2009 | Zhang | .................... | G06N 5/025 |
| | | | | 706/47 |

OTHER PUBLICATIONS stackoverflow.com, published 2010, http://stackoverflow.com/questions/4247938/better-data-structure-than-hashtable-to-keep-track-of-processed-records.*

Robert B. Doorenbos, "Production Matching for Large Learning Systems", Computer Science Department of Carnegie Mellon University in Pittsburgh, PA, CMU-CS-95-113, Jan. 31, 1995.

* cited by examiner

LEVERAGING UNIQUE OBJECT REFERENCES TO ENHANCE PERFORMANCE OF RETE-BASED RULE ENGINES

BACKGROUND

The disclosure relates generally to optimizing the performance of rule engines, and more specifically to a system and method for using an aggregation model to enhance the performance of RETE-based rule engines.

Typical management systems that track and respond to changes across large numbers of machines, images, and services need to be capable of responding to unscheduled occurrences. Thus, code written for these management systems must be able to specify actions to be taken when specific situations arise, e.g., event-driven programming that defines responses to conditions.

For example, forwarding chaining systems are systems that are structured in the form of "condition/action" rules, or rules of the form "IF [some condition hold] THEN [perform some action]." Such rules are referred to as forward chaining systems because each rule execution traverses a link in a chain of system states from past state to further states. In this approach, the states of system components are not made explicit, and each rule's conditions only specify as much information as is required to determine if the rule should be executed, which is only a subset of the system's available state information. In particular, systems with large numbers of components may be difficult for forward chaining approaches because it may be inefficient in tracking all potential state changes and determining which rule should be applied in a timely fashion.

SUMMARY

According to one embodiment of the disclosure, a method may include adding a plurality of objects into a working memory of a rule engine, processing, via a rule engine, the plurality of objects through a plurality of rules stored in a rule repository, creating, via the rule engine, a rule network based on the plurality of rules, the rule network comprising a root node and a child node, associating, via the rule engine, the root node with a predetermined list of object references, building, at the root node, a multi-object sub-token based on the plurality of objects that satisfy the predetermined list of object references, and passing the multi-object sub-token from the root node to the child node. As will be discussed below, the embodiment of the disclosure is not limited to a method, and may include a system and a computer program product.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

DETAILED DESCRIPTION

Figure 1:
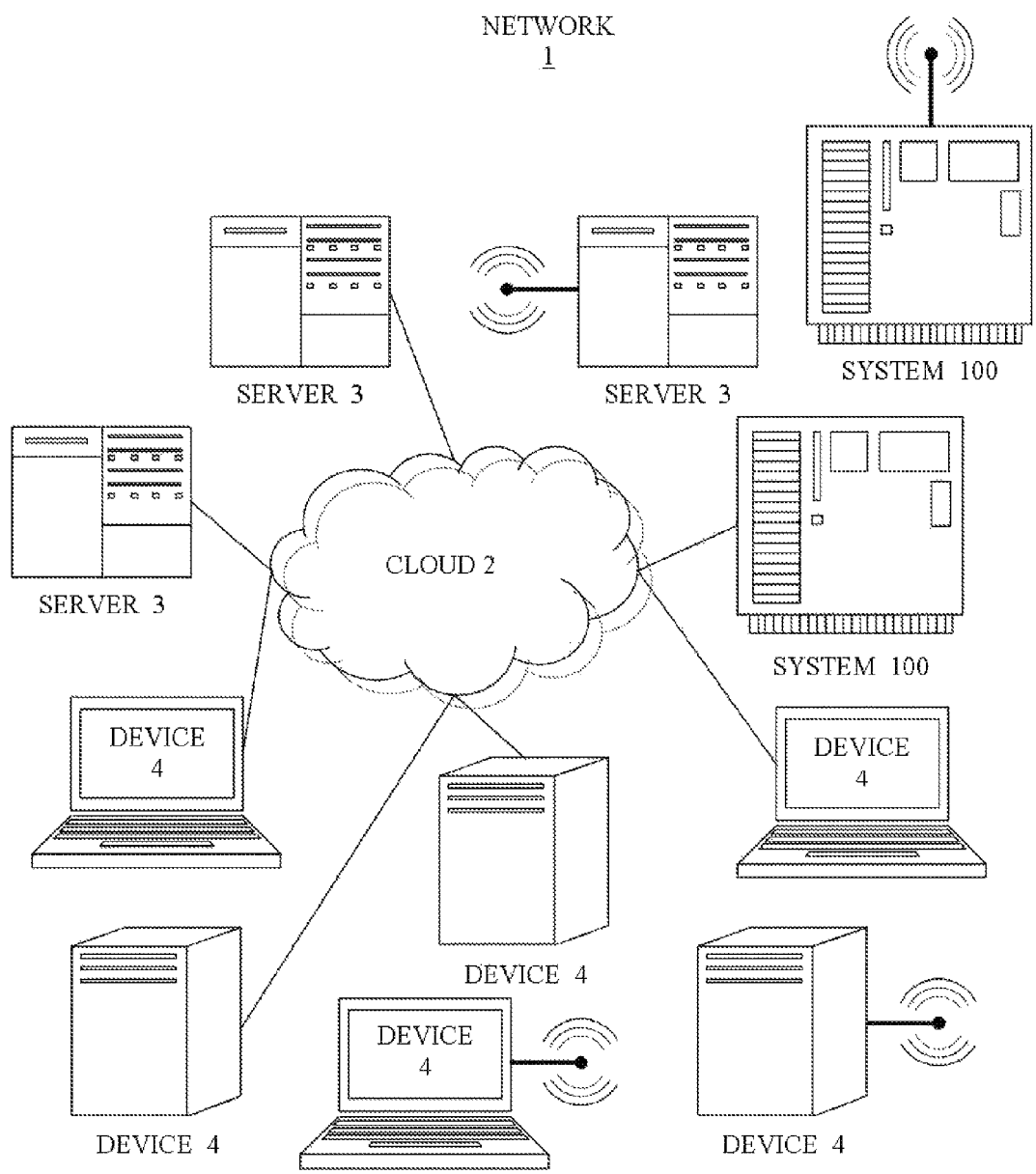
FIG. 1 is a schematic representation of a network for a user to access a RETE-based rule engine.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

While certain example systems and methods disclosed herein may be described with reference to mainframes in cloud computing, systems and methods disclosed herein may be related to architecture and information technology ("IT") service and asset management in cloud computing, as well as usability and user experience in middleware and common services. Systems and methods disclosed herein may be applicable to a broad range of applications that monitor various parameters associated with various disciplines, such as, for example, IT systems and other activities of importance to the user.

Referring now to FIG. 1, a network 1 for a user to access and use a RETE rule-based rule engine. Network 1 may comprise one or more clouds 2, which may be public clouds, private clouds, or community clouds. Each cloud 2 may permit the exchange of information and services among users that are connected to such clouds 2. In certain configurations, cloud 2 may be a wide area network, such as the Internet. In some configurations, cloud 2 may be a local area network, such as an intranet. Further, cloud 2 may be a closed, private network in certain configurations, and cloud 2 may be an open network in other configurations. Cloud 2 may facilitate wired or wireless communications of information among users that are connected to cloud 2.

Network 1 may comprise one or more servers 3 and other devices operated by service providers and users. Network 1 also may comprise one or more devices 4 utilized by users. Service providers and users may provide information to each other utilizing the one or more servers 3, which connect to the one or more devices 4 via cloud 2. Servers 3 may comprise, for example, one or more of general purpose computing devices, specialized computing devices, mainframe devices, wired devices, wireless devices, monitoring devices, infrastructure devices, and other devices configured to provide information to service providers and users. Devices 4 may comprise, for example, one or more of general purpose computing devices, specialized computing devices, mobile devices, wired devices, wireless devices, passive devices, routers, switches, mainframe devices, monitoring devices, infrastructure devices, and other devices utilized by service providers and users. Example items may include network 1, cloud 2, servers 3, and devices 4.

Moreover, network 1 may comprise one or more systems 100 that may provide a RETE rule-based rule engine. System 100 may be, for example, one or more of a general purpose computing device, a specialized computing device, a wired device, a wireless device, a mainframe device, an infrastructure device, a monitoring device, and any other device configured to provide an integrated video module. System 100 may also be configured to collect data from one or more data sources (e.g., servers, sensors, networks, interfaces, other devices). System 100 may collect information from network 1, cloud 2, servers 3, devices 4, and other devices connected to cloud 2. System 100 may connect to cloud 2 and monitor network 1, cloud 2, servers 3, devices 4, and other devices connected to cloud 2 for available information. The available information may be user information, access information, performance information, infrastructure information, software or application information, usability information, and other information provided by service providers and users. By collecting the available information from network 1, cloud 2, servers 3, devices 4, and other devices connected to cloud 2, system 100 may perform one or more tasks associated with using a RETE rule-based rule engine. These one or more tasks may comprise adding a plurality of objects into a working memory of a rule engine.

In some configurations, one or more of servers 3 and devices 4 may comprise system 100. In other configurations, system 100 may be separate from servers 3 and devices 4.

Figure 2:
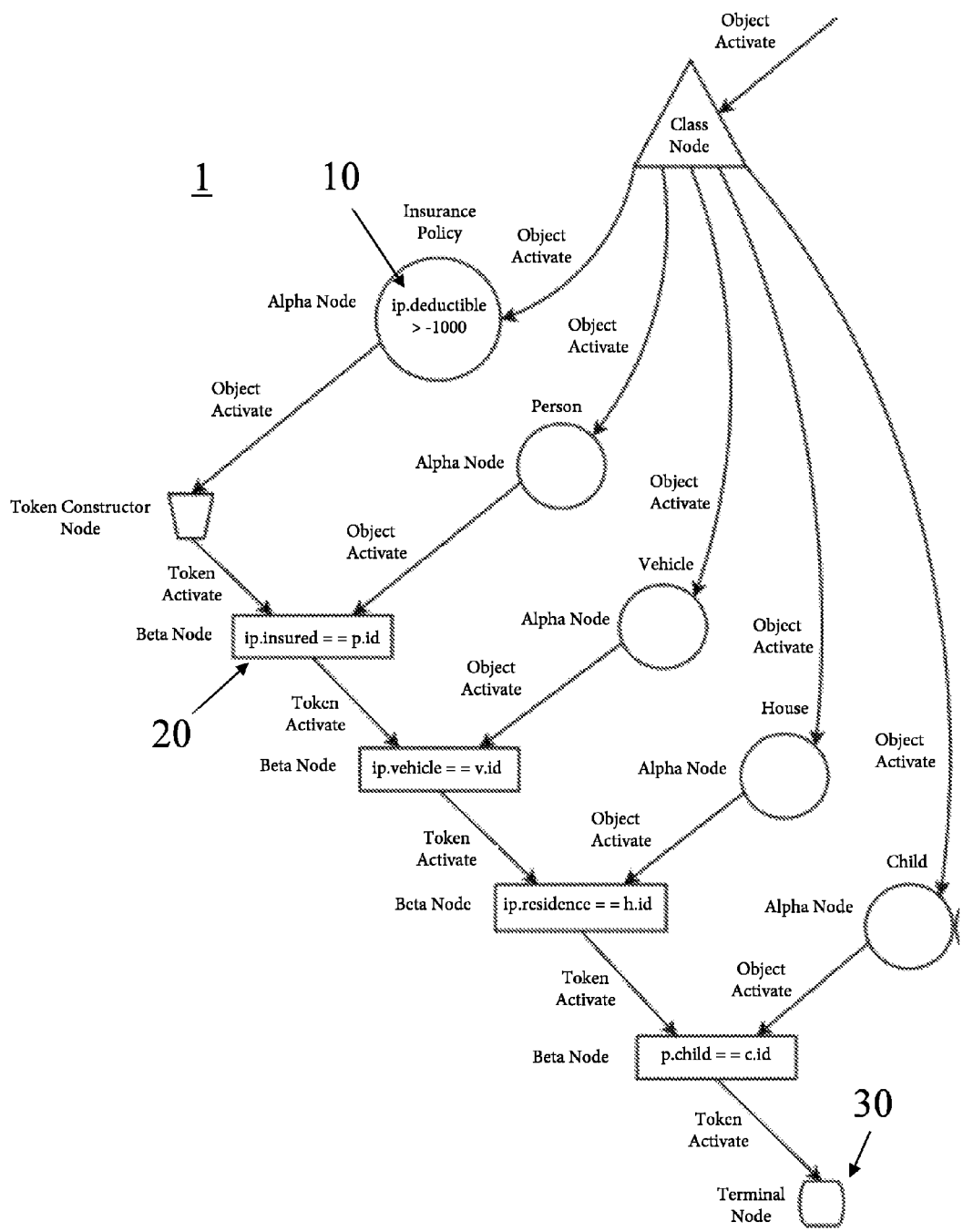
FIG. 2 is a schematic representation of an example of a rule selection system.

As shown in FIG. 2, a RETE algorithm is an example of a rule selection system. Specifically, the RETE algorithm is programmed to precompute the query joins specified by the rules and only updates them as required when data values change. Since, most of the data in the system is not changing at any given moment, this system may reduce the work required to track changes to the system state.

In a RETE-based rule engine, each individual object (e.g., working memory element, or WME) of the set of all objects (e.g., working memory) is added to the top of RETE network 1, for example, through an objectActivate( ) method of a class node which dispatches them based on their types of their nodes. As shown in FIG. 2, every declaration (e.g., a pattern with or without conditions used to match working memory objects) in a rule (e.g., which may contain many declarations) creates an alpha node 10 in RETE network 1. Alpha node 10 holds references to all WMEs that satisfy the single object condition specified in the declaration. In addition, network 1 is constructed which holds precomputed join results at specific nodes (e.g., beta nodes 20), and changes propagate through network 1 and construct "rule instantiations" at terminal node 30. Beta nodes 20 are assigned the conditions that reference WMEs from multiple declarations. For example, WMEs that satisfy the conditions in an alpha node 10 get passed to the objectActiviate( ) method of the corresponding beta node 20, and these beta nodes 20 group together WMEs satisfying joint constraints into "tokens" 40 (e.g., groups of connected WMEs) (discussed below). These tokens are then passed through network 1, for example, via calls to the tokenActivate( ) methods of downstream beta nodes accumulating additional WMEs until they reach terminal node 30. Once the token reaches terminal node 30, a rule instantiation is created and added to the rule engine's conflict set, which consists of all instantiations that are waiting to fire in each cycle.

With respect to the following rule:

```
rule example {
  InsurancePolicy I;
  Person P where .id == I.insured;
  Vehicle V where .id == I.vehicle;
  House H where .id == I.residence;
  Child C where .id == P.eldestChild;
  . . . .
```

Assuming each person has a single vehicle, a single house, a single child, and a single insurance policy, 200 people would generate 200 rule instantiations since the rule requires that the objects are connected via ids. In other words, there would be 200 tokens containing (I, P), 200 tokens containing (I, P, V), 200 tokens containing (I, P, V, H), and 200 tokens containing (I, P, V, H, C), resulting in a total of 800 tokens. In addition, even though tokens don't get created, possible combinations need to be tested to find out which ones are valid. The "insured" field of each insurance policy must be compared to the "id" field of each person (200*200=40,000 comparisons). The "vehicle" field contained in the insurance policy for each (I, P) token must be compared against every vehicle's "id" field (another 40,000 comparisons), etc. So, without further improvements, the rule above would require 160,000 comparisons.

A general improvement on these "unique id" tests may be achieved by hashing the field values taking part in equal comparisons. Then each new object entering a beta node from either the objectActivate( ) or the tokenActivate( ) only needs to be matched up with the objects from the other side whose field values hash consistently. In the beta node for the first comparison (P.id==I.insured), each insurance policy would be placed in a map based on the value of its "insured" field, as shown in Table 1:

TABLE 1

| "Insured" field value | Set of matching insurance policies |
|---|---|
| person1 | (<insurancePolicy 10>, . . .) |
| person2 | (<insurancePolicy 13>, . . .) |
| person3 | (<insurancePolicy 7>, . . .) | and each person would be placed in a corresponding map, as shown in Table 2:

TABLE 2

| "Id" field value | Set of matching people |
|---|---|
| person1 | (<person 1>, . . .) |
| person2 | (<person 2>, . . .) |
| person3 | (<person 3>, . . .) |

If a new insurance policy arrived at the beta node, it would only be compared to the people in the second map that were associated with an "id" value that matched the policy's "insured" field value. If a new person arrived, it would only be compared with the policies in the first map that were associated with an "insured" value that matched the person's "id" value. As a result, the hashing optimization reduces the number of comparisons performed to roughly the same number as the number of tokens created (800) in the unique id case. This is a typical RETE optimization and has a huge impact on performance at the expense of using more memory to maintain the hash tables. However, even the hashing solution requires processing many objects that may not end up as part of a match.

Figure 3:
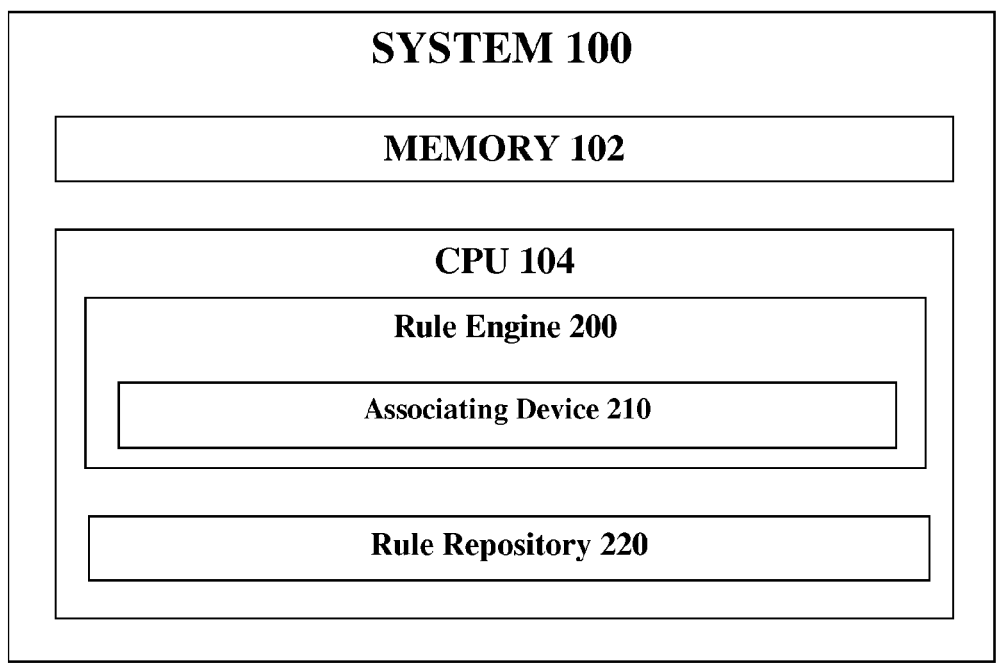
FIG. 3 is a schematic representation of an embodiment of a rule engine according to the example embodiment.

Referring now to FIG. 3, an embodiment of a rule engine usable with some embodiments of the present disclosure is shown. In some embodiments, a system 100, which may provide a RETE rule-based rule engine, is now described. System 100 may reside on one or more networks 1. System 100 may comprise a memory 102 and a CPU 104.

Memory 102 may store computer-readable instructions that may instruct system 100 to perform certain processes. Memory 102 may comprise, for example, RAM, ROM, EPROM, Flash memory, or any suitable combination thereof. In particular, when executed by CPU 104, the computer-readable instructions stored in memory 102 may instruct CPU 104 to operate as one or more devices.

CPU 104 may operate as a rule engine 200, which may comprise an associating device 210. CPU 104 may operate as a rule repository 220.

Figure 4:
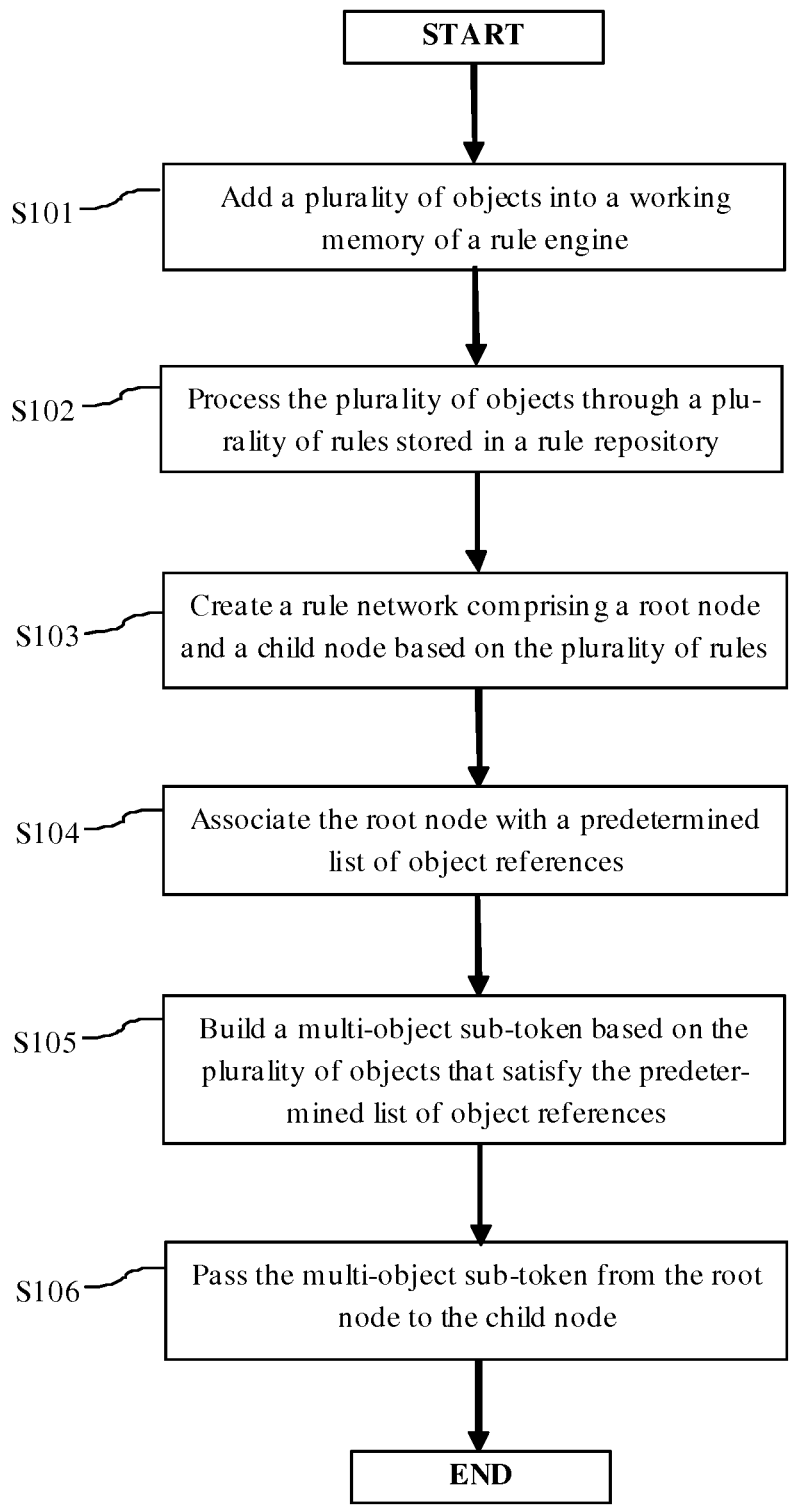
FIG. 4 illustrates a process of implementing a rule engine according to the example embodiment.

Referring now to FIG. 4, processes performed by rule engine 200 are now described. In S101, rule engine 200 may add a plurality of objects into a working memory of rule engine 200, which may include memory 102 or a separate, rule-engine-specific memory. Then, in S102, rule engine 200 may process the plurality of objects through a plurality of rules stored in a rule repository 220. in S103, rule engine 200 may create a rule network comprising a root node and a child node based on the plurality of rules. Then, in S104, rule engine 200, acting as an associating unit, may associate the root node with a predetermined list of object references. In S105, rule engine 200 may build a multi-object sub-token based on the plurality of objects that satisfy the predetermined list of object references. Then, in S106, rule engine 200 may pass the multi-object sub-token from the root node to the child node. After the multi-object sub-token is passed to the child node, the process may terminate.

Referencing back to the example of the rule discussed above, in the example embodiment, if the rule were modified as follows:

```
rule example2 {
  InsurancePolicy I where .deductible >= 1000;
  Person P where .id == I.insured;
  Vehicle V where .id == I.vehicle;
```

```
House H where .id == I.residence;
Child C where .id == P.eldestChild
``` any vehicles, houses, children, or insured people associated with low-deductible policies would be processed to no purpose because they would never end up part of a match. An example embodiment treats a set of objects linked by unique ids as a single aggregation. In the example, the link pattern is:

```
InsurancePolicy I:
    insured ==> Person P;
        eldestChild ==> Child C
    vehicle ==> Vehicle V
    residence ==> House H
```

The InsurancePolicy object is the "root" of the aggregation. When an InsurancePolicy meeting the deductible constraint is fed to the rule, its id references may be followed to find the specific Person, Vehicle, and Residence that should be associated and ignore any other instances of those classes. Any instances not referenced by matching InsurancePolicies will never be processed. The same logic applies to any instances of Child that are not referenced by Persons associated with valid InsurancePolicies. If a matching InsurancePolicy arrives and its referenced Vehicle has not yet appeared, a specific reference link may be associated with the Vehicle's id so that it may be added to the aggregation when it arrives. Thus, using this aggregation approach of the example embodiment on the 200 instances of three different object-type dataset may result in at most 200 tokens, 200 rule instantiations and no hashing optimization comparisons.

Figure 5:
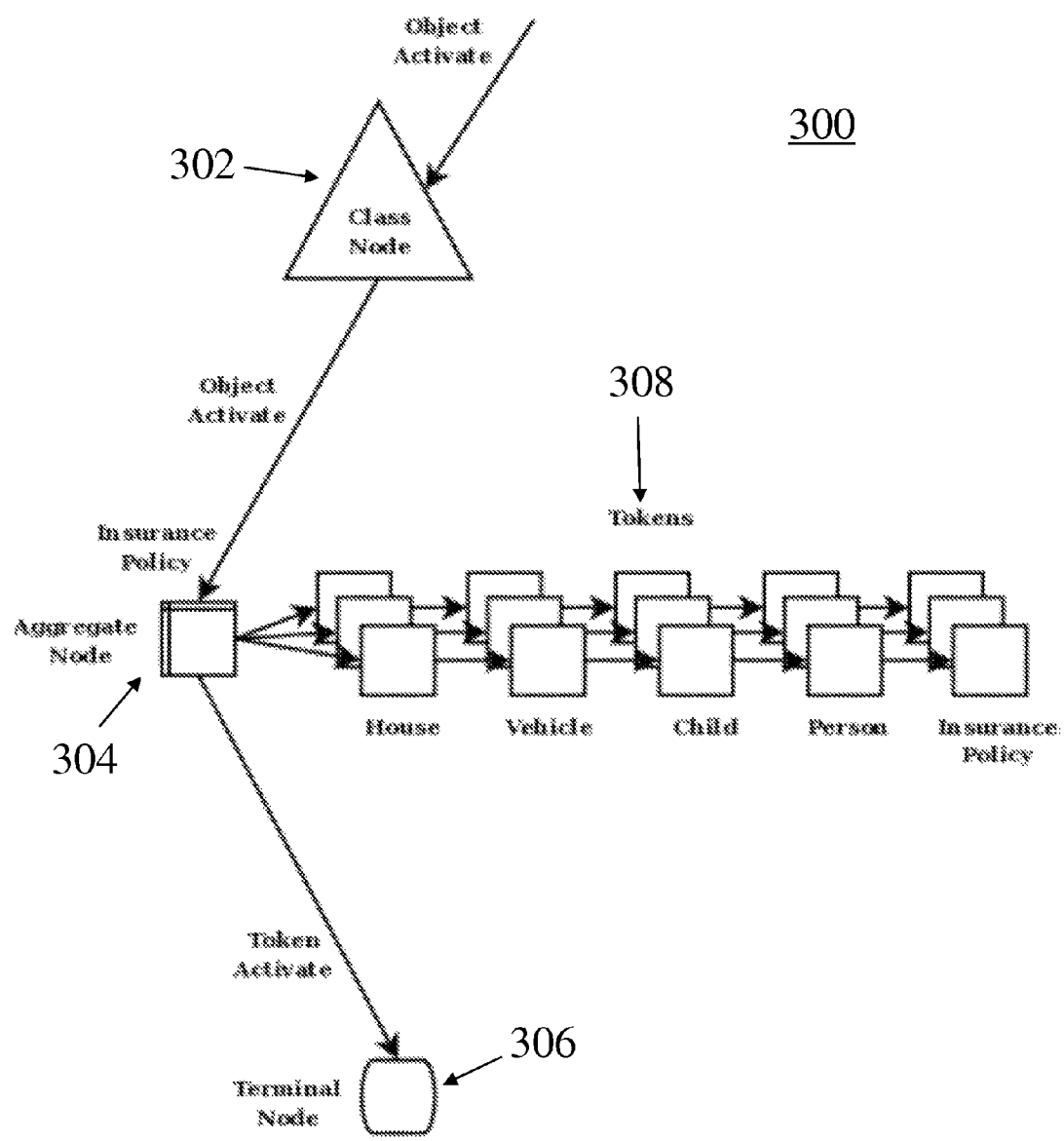
FIG. 5 is a schematic representation of a network utilizing a RETE-based rule engine according to some embodiments of the disclosure.

Referring now to FIG. 5, a RETE rule-based rule engine based on the example embodiment modifies the original RETE engine to apply the approached mentioned above. Specifically, the rule syntax of the example embodiment allows a user to specify the below aggregation, producing a network 300, as shown in FIG. 5:

```
rule example3 {
    InsurancePolicy I: {
        .insured ==>
            Person A; {
                eldestChild ==> Child C
            },
        .vehicle ==> Vehicle V,
        .residence ==> House H
    } where I.deductible >= 1000
```

Network 300 may include a class node 302, aggregate node 304, terminal node 306, and tokens 308. Using a basic comparison example, a standard RETE engine behaves like a naive relational database; any fields of consistent type may be joined and the join processing is generic. In contrast, the example embodiment acts like an object or network database with directly referenced object references or referenced by a unique identity for the objects (e.g., hard-wired). In particular, unique references may be used to optimize joins and manipulate aggregates in more powerful ways.

Figure 6A:
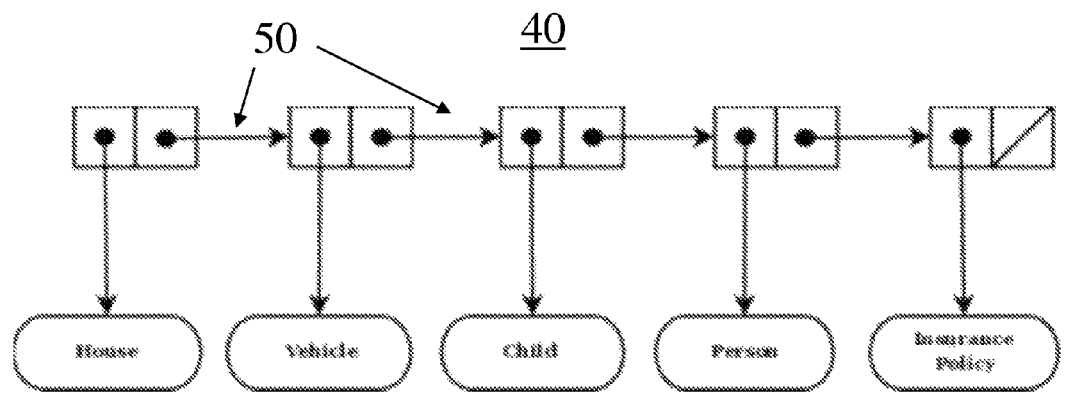
FIGS. 6A and 6B are schematic representations of RETE tokens.

Referencing back to the standard RETE engine discussed above, a token 40 may be a list 50 (e.g., a linked list) of object references, as shown in FIG. 6A. Normally, a token 40 may be built as objects move through the network. Each alpha node 10 may process a single declaration from a rule and passes on a single object at a time. Each new beta node 20 may take an existing token and adds a single new object to it when either its objectActivate( ) or tokenActivate( ) method is called.

Figure 6B:
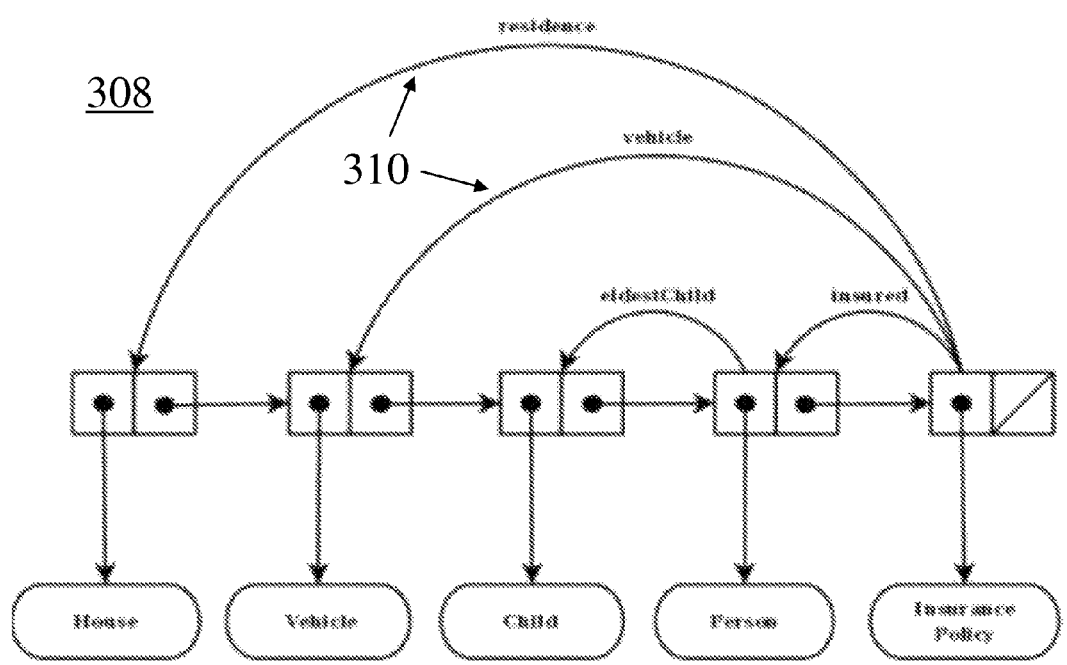

In contrast, in the example embodiment, in the aggregate case, a multi-object sub-token 308 may be built in place in an aggregate node 304 (i.e., aggregate "alpha" node) before passing it farther down into the network, as shown in FIG. 6B. Along with the standard token links 50 shown in FIG. 6A, there may be a set of implied links 210 associated with an aggregate token 308. The implied links 310 may be defined by the id references specified with '==>' in a rule containing aggregates. The implied links 310 may not be actually stored in tokens 308 but are tracked as token indices within an aggregate alpha node 304. For example, in FIG. 6B, the stored links may be (indices start at 0):

```
index 4 (insurance policy)
    insured/3 (person), vehicle/1 (vehicle), residence/0 (house)
index 3 (person)
    eldestChild/2 (child)
```

Advantages of the example embodiment may include a RETE rule-based rule engine utilizes a tree structure of aggregates that enables optimizations that are not available in a standard RETE environment. For example, the hard links between objects contained in an aggregate may make many comparisons unnecessary, and may result in no processing of unreferenced objects and fewer comparisons during matching. In addition, since referenced objects are automatically processed when their referencing objects closer to the aggregate root are updated, they may not need to be updated separately. Thus, it may be possible to avoid some redundant operations in RETE rule-based rule engines, reduce memory footprint by having fewer nodes in the network, reduce inter-node propagation, and optimize updates, resulting in significant improvements in performance and scale.

In another example embodiment, additional optimization may include an ancestor modified procedure. In standard RETE, every rule creates an alpha node for each declaration. When a rule has more than one declaration, beta nodes are constructed to join the different declarations together. An aggregate node is an instance of an alpha node. The root object of the declaration will have references to other objects (i.e, its children). Each child object may have references to additional children and so on. Objects are assembled for the aggregation node starting with the root object.

Using the example rule discussed above, an aggregation node may create tokens with slots for InsurancePolicies, Persons, Children, Vehicles, and Residences. For each InsurancePolicy (root object), the Person it references is fetched, followed by the Child referenced by the Person. Then the Vehicle and Residence referenced by the InsurancePolicy are retrieved. Since all child objects were processed during the insertion of the root object, they do not need to be fed through the aggregation node separately.

However, when updating an object, the engine may check to see if any of its ancestors has also been modified in the current cycle. If it has such an ancestor, there is no need to process the object explicitly since processing the ancestor will implicitly cause it to be processed. Thus, it may be possible to avoid some redundant operations by using this ancestor modified procedure. In other words, since referenced objects are automatically processed when their referencing objects closer to the aggregate root are updated, they may not need to be updated separately.

The flowchart and block diagrams in FIGS. 1-6 illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
   receiving a plurality of objects into a working memory of a rule engine,
   processing, via the rule engine, the plurality of objects through a plurality of rules stored in a rule repository,
   creating, via the rule engine, a RETE-based rule network based on the plurality of rules, the rule network comprising an alpha node and first and second child nodes of the alpha node,
   associating, via the rule engine, the alpha node with a predetermined list of object references,
   building a multi-object sub-token based on the plurality of objects that satisfy the predetermined list of object references, the multi-object sub-token comprising a first linked list of object references,
   assigning a unique ID to the plurality of objects that satisfy the predetermined list of object references;
   tracking, using a token index within the alpha node, a second linked list of object references that is different than the first list, the second linked list of object references being a subset of the first linked list of object references, and
   passing the multi-object sub-token from the alpha node to the first and second child nodes.

2. The method of claim 1, wherein the predetermined list of object references are configured to be directly referenced to the alpha node.

3. The method of claim 1, wherein the predetermined list of object references comprises a list of object references configured to be aggregated together in a specific order.

4. A system comprising:
   a working memory configured to receive a plurality of objects;
   a processor; and
   a rule engine configured to, when executed by the processor:
   process the plurality of objects through a plurality of rules stored in a rule repository,
   create a RETE-based rule network based on the plurality of rules, the rule network comprising an alpha node and first and second child nodes of the alpha node,
   associate the alpha node with a predetermined list of object references,
   build a multi-object sub-token based on the plurality of objects that satisfy the predetermined list of object references, the multi-object sub-token comprising a first linked list of object references,
   assign a unique ID to the plurality of objects that satisfy the predetermined list of object references,
   track, using a token index within the alpha node, a second linked list of object references that is different than the first list, and
   pass the multi-object sub-token from the aggregate node to the child node.

5. The system of claim 4, wherein the predetermined list of object references are configured to be directly referenced to the alpha node.

6. The system of claim 4, wherein the predetermined list of object references comprises a list of object references configured to be aggregated together in a specific order.

7. A computer program product comprising:
   a non-transitory computer-readable storage medium having computer-readable program code embodied therewith, the computer-readable program code comprising:
   computer readable program code configured to receive a plurality of objects;
   computer readable program code configured to process the plurality of objects through a plurality of rules stored in a rule repository;
   computer readable program code configured to create a RETE-based rule network based on the plurality of rules, the rule network comprising an alpha node and first and second child nodes of the alpha node;
   computer readable program code configured to associate the alpha node with a predetermined list of object references;
   computer readable program code configured to build a multi-object sub-token based on the plurality of objects that satisfy the predetermined list of object references, the multi-object sub-token comprising a first linked list of object references, computer readable program code configured to assign a unique ID to the plurality of objects that satisfy the predetermined list of object references, computer readable program code configured to track, using a token index within the alpha node, a second linked list of object references that is different than the standard token links; and computer readable program code configured to pass the multi-object sub-token from the alpha node to the first and second child nodes.

8. The computer program product of claim 7, wherein the predetermined list of object references are configured to be directly referenced to the alpha node.

9. The computer program product of claim 7, wherein the predetermined list of object references comprises a list of object references configured to be aggregated together in a specific order.

* * * * *